(No Model.)
G. MISCHLER.
HARVESTER CUTTING APPARATUS.
No. 479,568. Patented July 26, 1892.
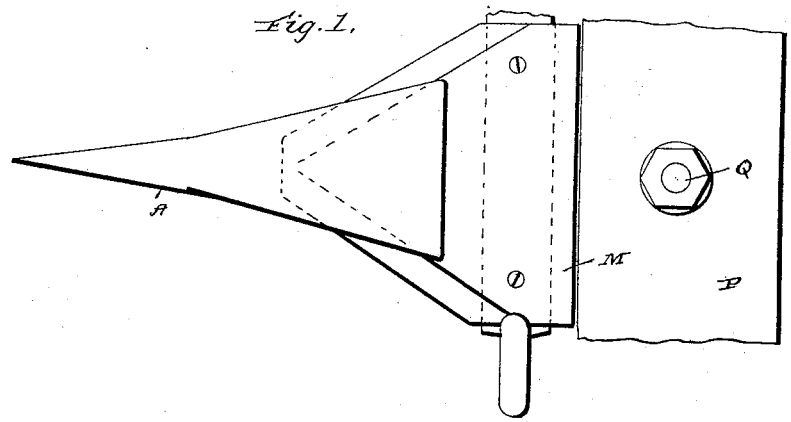
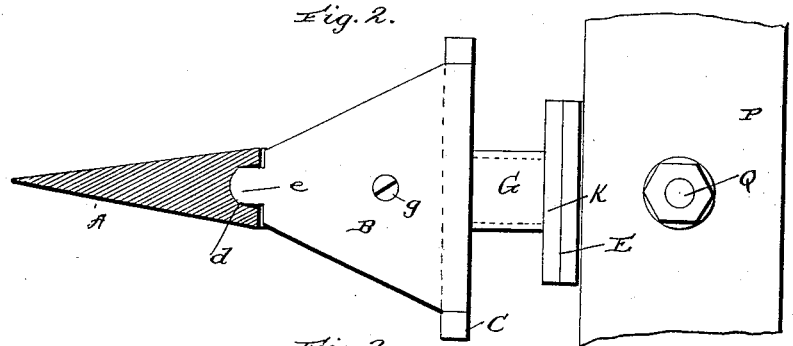
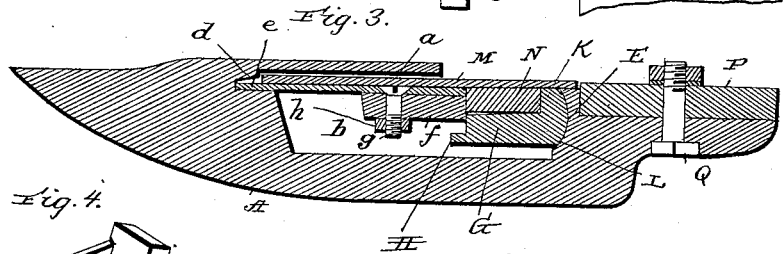
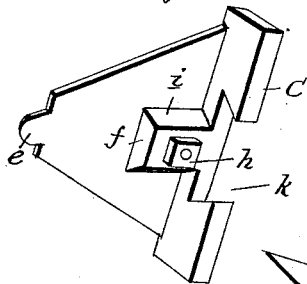
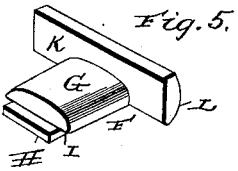
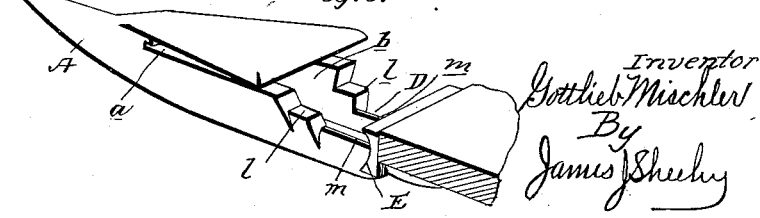
Witnesses:
C. H. Raeder
N. F. Matthews
Inventor
Gottlieb Mischler
By James J. Sheehy
Attorney
THE NORRIS PETERS CO., PHOTO-LITHO., WASHINGTON, D. C.

UNITED STATES PATENT OFFICE.

GOTTLIEB MISCHLER, OF ROCK ISLAND, ILLINOIS.

HARVESTER CUTTING APPARATUS.

SPECIFICATION forming part of Letters Patent No. 479,568, dated July 26, 1892.

Application filed April 7, 1892. Serial No. 428,193. (No model.)

*To all whom it may concern:*

Be it known that I, GOTTLIEB MISCHLER, a citizen of the United States, residing at Rock Island, in the county of Rock Island and State of Illinois, have invented certain new and useful Improvements in Harvester Cutting Apparatus; and I do declare the following to be a full, clear, and exact description of the invention, such as will enable others skilled in the art to which it appertains to make and use the same.

This invention has relation to a harvester cutting apparatus; and the novelty will be fully understood from the following description and claims, when taken in connection with the annexed drawings, in which—

Figure 1 is a plan view of a guard-finger attached to a portion of a finger-bar with the knives in position thereon. Fig. 2 is a plan view of the same with the finger partly in section and the cutter-bar removed. Fig. 3 is a longitudinal vertical sectional view of the complete device. Fig. 4 is a perspective view of the lower knife with its attachment for locking the same from lateral play. Fig. 5 is a perspective view of a locking key or device to secure and prevent backward movement of the lower knife. Fig. 6 is a perspective view of the guard-finger with the knife-securing device removed and the finger-bar partly broken away and partly in section.

Referring by letter to said drawings, A indicates a guard-finger, which is provided with the usual slot $a$ for the passage of the side knives. Beneath this slot $a$ the body of the guard-finger is recessed longitudinally, as shown at $b$, for a purpose which will be presently explained, and the said finger is recessed at $d$ to receive the forward extension of the lower knife.

B indicates the lower knife. This knife has its forward end provided with a reduced extension $e$, designed to enter the recess $d$ in the guard-finger.

Secured to the rear under side of the knife B is a cross head or bar C, having about midway of its length a forwardly-extending branch $f$, which is provided with a transverse hole, as shown, to coincide with a hole in the knife B and receive a screw-threaded bolt $g$, which is secured in position by a nut $h$. The extension $f$ has its lateral edges $i$ preferably beveled, so that it may snugly bear against the inner side walls of the recessed part of the finger-bar. This cross bar or head C is provided midway of its length on its under side with a dovetail recess $k$, which is designed to engage corresponding-shaped projections $l$, formed in the side walls of the finger in rear of the slot $a$, whereby the said lower knife B may be secured from lateral play.

The finger-bar A is further recessed, as shown at D, so as to provide walls $m$ to receive the beveled or rabbeted sides of a key, as will be presently described, and rising from the rear of this recessed portion D is a vertically-disposed curvilinear wall or flange E.

F indicates a key or device for securing the lower knife in the guard-finger. This key is generally of T shape in outline, having a horizontal branch G, recessed at its forward end to form a tongue H, which is designed to enter between the shouldered parts $l$ and that portion of the dovetail $k$ of the cross-head C, which lies between said shouldered portions. This branch of the key has its longitudinal edges rabbeted, as shown at I, so as to bear upon the upper edge of the walls $m$ when seated. The key has its transverse portion K beveled on its rear longitudinal side, as shown at L, so as to snugly fit against the curved face of the wall E when in a locked position.

M indicates one of the upper knives, which is secured in the usual manner to the knife-bar N, which may also be of the ordinary construction, and in practice is arranged upon the horizontal branch of the key F, so as to play between the cross head or block of the lower knife and the forward side of the vertical branch of the key.

P indicates a finger-bar, which is secured to the heel of the guard-finger by a bolt Q or other suitable means, and has its forward longitudinal edge bearing against the rear side of the projected portion of the wall or flange E.

In operation, after the lower knife is secured to the cross head or block, as shown in Fig. 4 of the drawings, the knife is then slipped into the recess $a$ of the guard-finger and pushed forward, so that the projection $e$ of the knife will enter the recess $d$ of the finger, thus bringing the dovetail recess $k$ to embrace the shoulders $l$. The key is then placed with its forward recessed end in the recess $b$ of the guard-finger and within the dovetail recess of the head or block C. The opposite end of the key is then forced down so as to spring to its seat, as shown in Fig. 3 of the drawings, bringing the beveled transverse branch K so as to bear snugly against the curvilinear flange or wall E and the rabbeted portions I bearing upon the upper edges of the side walls *m*, when the knife will be securely locked in proper position in the finger-bar and prevented from either lateral or horizontal movement. Should the knife become impaired or injured and it is desired to remove the same, it is simply necessary to spring the key out of its seat, when the knife may be first drawn rearwardly, so as to disengage the projected point or end *e* from the recess *d* and the dovetail portion of the cross head or bar on the shoulders or lugs *l*, when it may then be moved sidewise out of the slot *a*.

Having described my invention, what I claim is—

1. In a cutting apparatus for harvesters, the combination, with a guard-finger recessed, as described, of a lower cutting-knife, a block secured to the under side thereof and adapted to enter the recess of the guard-finger, and also having a dovetail recess to engage the lugs or shoulders of said finger, and a locking-key having its horizontal portions provided with a lip or projection to enter the recess in the guard-finger and within the dovetailed recess of said block or head, and also having a cross branch, so as to be interposed between the rear edge of the lower cutting-knife and the finger-bar, substantially as specified.

2. The guard-finger recessed, as described, and having the shoulders in rear of the knife-slot and also having the vertically-disposed curved wall or flange in rear of the recess, in combination with the lower knife, the cross bar or block secured to the rear under side thereof and having a dovetail recess to engage said shoulders or lugs of the guard-finger, and the key having its horizontal branch rabbeted in its under longitudinal sides and recessed so as to form a projection at its forward end and also having the transverse branch beveled on its rear side, said key being interposed between the block or head carrying the lower knife and the rear curvilinear wall or flange of the finger-bar, so as to lock said branch forwardly in its seat, substantially as specified.

In testimony whereof I affix my signature in presence of two witnesses.

GOTTLIEB MISCHLER.

Witnesses:
JOS. L. HAAS,
BERNHART SEEBURGER.